(12) United States Patent
Braun et al.

(10) Patent No.: US 6,851,119 B2
(45) Date of Patent: Feb. 1, 2005

(54) RECORDING/REPRODUCING DEVICE

(75) Inventors: Augustinus Laurentius Braun, Eindhoven (NL); Leonardus Petrus Maria Tielemans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 137 days.

(21) Appl. No.: 10/236,185

(22) Filed: Sep. 6, 2002

(65) Prior Publication Data

US 2003/0053391 A1 Mar. 20, 2003

(30) Foreign Application Priority Data

Sep. 10, 2001 (EP) .............................................. 01203411

(51) Int. Cl.[7] ............................... G11B 5/12; B01J 8/04
(52) U.S. Cl. ...................................... 720/648; 423/210
(58) Field of Search ........................ 423/210; 369/75.1; 360/132, 97.01, 97.02; 242/331.4

(56) References Cited

U.S. PATENT DOCUMENTS

| | | | |
|---|---|---|---|
| 3,846,835 A | * 11/1974 | Horovitz et al. | ......... 360/97.03 |
| 4,054,931 A | * 10/1977 | Bolton et al. | ............ 360/97.03 |
| 4,268,878 A | * 5/1981 | Kearns | ..................... 360/97.02 |
| 4,308,041 A | * 12/1981 | Ellis et al. | ................ 360/97.02 |
| 4,329,722 A | * 5/1982 | West | ........................ 360/97.03 |
| 4,581,668 A | * 4/1986 | Campbell | ..................... 369/72 |
| 4,583,213 A | 4/1986 | Bracken et al. | ............. 369/261 |
| 4,633,349 A | * 12/1986 | Beck et al. | .............. 360/97.02 |
| 4,684,510 A | * 8/1987 | Harkins | .................... 360/97.02 |
| 4,809,102 A | * 2/1989 | Hatchett et al. | ......... 360/97.03 |
| 4,888,655 A | * 12/1989 | Bonn | ....................... 360/97.03 |
| 5,034,835 A | * 7/1991 | Yokoyama | ................ 360/97.02 |
| 5,764,435 A | * 6/1998 | Sugimoto et al. | ......... 360/97.02 |
| 2002/0039340 A1 | 4/2002 | Minasc | ...................... 369/75.1 |

FOREIGN PATENT DOCUMENTS

| EP | 0244525 A1 | 11/1987 | ........... G11B/23/02 |
|---|---|---|---|

* cited by examiner

*Primary Examiner*—George J. Letscher
*Assistant Examiner*—Christopher R. Magee
(74) *Attorney, Agent, or Firm*—Michael E. Belk (57) ABSTRACT

A filter arrangement for a recording/reproducing wherein
 an air filter is adapted to filter an air flow of ambient air present within the housing during operation of the device flowing over an information surface of a rotating information disc disposed adjacent to the information surface in parallel spaced relation thereto,
 a casing within the housing encasing an information surface of an information disc disposed on the disc driving arrangement and provided with an air inlet for air to be filtered and an air exhaust for filtered air.

To decrease the energy consumption of air filtering while ensuring good filtering results, the air filter arranged stationary within the housing to extend over the disc information surface, the airflow flowing axially through the filter and being induced by the naturally occurring pumping action of the rotating information disc, while the air flow resistance of the air inlet, the air filter and the air exhaust exhibit mutually adapted air flow resistance values substantially preventing any air flow from outside the casing, through the casing and out of the exhaust different from the air flow from the air inlet, through the air filter, the casing and out of the exhaust.

16 Claims, 8 Drawing Sheets

RECORDING/REPRODUCING DEVICE

The present invention relates to a recording/reproducing device for recording/reproducing information on/from an information disc in accordance with the preamble of claim 1.

In the art of data storage on information discs, there is the ever ongoing tendency to increase the data density on information discs and on data media in general and to increase the data transfer rates. One of the consequences of these trends is that the widths of the data tracks on the data medium are becoming smaller and the speed of rotation of the information disc increases. Dirt and dust particles which are present in the ambient air and adhere to the information surface of the information disc as well as to the pick-up device used for recording information on and reproducing information from the information surface of the information disc will cause increasing problems in this respect.

The working distance between freely floating pick-ups and information discs has the tendency to approach more and more the dimensions of the dust particles which are present in the ambient air. Therefore, there is an increasing risk of mechanical interaction between the pick-up device and the dust particles which adhere to the information disc.

In the case of optical disc systems, the surface area of the pickup laser spot on the information surface of the disc is becoming increasingly smaller. Dust particles which adhere to the information disc will therefore block a larger part of the laser beam.

As the speed of the information disc increases, the air flow over the information surface of the information disc increases and more dust particles will adhere to the information surface.

Increasing the speed of the information disc will require a disc driving arrangement of increased capacity. More heat is generated so that more cooling is needed. Cooling is normally provided by a forced air flow which results in the transport of more dust particles in the vicinity of the information disc and a pick-up device.

A recording/reproducing device of the kind referred to in the preamble of claim 1 is known per se from JP-10 275 458 A. This publication discloses a recording/reproducing device for optical discs. The disc driving arrangement comprises a turntable for supporting the optical disc. The lower side of the rotatable turntable is provided with an air fan of the centrifugal type and with an annular air filtering means having a meandering shape surrounding the outer peripheral portion of the air fan. A stationary casing, in which the optical disc is encased, comprises a co-axial air inlet opening on the lower side and a co-axial air exhaust opening on the opposite upper side. The turntable including the air fan and the annular dust filter rotates with clearance in the air inlet opening. During rotation of the optical disc, an air flow is generated by the air fan, through the annular air filtering means over the lower side of the rotating optical disc which rotates with clearance within the casing, over the upper side of the rotating optical disc and out through the exhaust.

A recording/reproducing device of the above known kind would seem to be less suitable for high rotational speeds. The air filtering means require an increasing power at high rotational speeds for driving the fan, so that more heat is produced and more cooling is needed. Also the provision of a centrifugal air fan and a special annular filter leads to an increased cost-price of the recording/reproducing device. A further disadvantage of this prior art recording/reproducing device is that some play is needed between the outer periphery of the annular air filtering means and the edge of the inlet opening provided in the casing. Unfiltered air may be sucked in from the outside into the casing through the gap which is present between the air filtering means and this edge of the casing.

It is an object of the invention to provide a recording/reproducing device of the kind described in the preamble of claim 1 and is suitable for high rotational speeds and can be produced at lower cost, while still providing the required air filtering results. According to the present invention, a recording/reproducing device in accordance with the preamble of claim 1 therefore comprises the features defined in the characterizing part of claim 1.

The air filtering means of the recording/reproducing device according to the invention are stationary and may consequently be easy to install or remove. The air flow flows axially through the filter means which may be large to minimise air flow resistance. The air flow is induced by the naturally occurring pumping action of the rotating information disc so that no special fan means need to be provided. By careful design in accordance with the invention, comprising the mutual adaptation of the air flow resistance values of the air flow resistance of the air inlet, the air filtering means and the air exhaust, any undesirable flow of air from the outside, through the casing and out of the exhaust which is different from the desirable air flow which flows from the inlet through the air filtering means and the casing to the exhaust may be prevented, so that 100% of the air flow which is flowing during operation of the recording/reproducing device over the information surface of the information disc has been filtered.

An advantageous embodiment of the invention is defined in claim 2. In this embodiment, the casing which encases the information disc during operation resembles a cylindrical box, one of the main walls of which comprises the air filtering means. The air filtering means may even comprise the whole area of the main wall, maximising the diameter of the air filtering means and minimising the air flow resistance of the air filtering means within the outer dimensions of the casing.

In many cases, information discs have an information surface on only one side, such as, for example, with optical information discs of the CD type. For this kind of disc, a recording/reproducing device as defined in claim 3 could be interesting. With this embodiment, the casing which encases the information surface of the information disc is provided with only one stationary main wall, while the information disc itself during use constitutes a second, rotatable main wall of the casing, thus simplifying the design of the recording/reproducing device.

Advantageous embodiments of the invention, more particularly regarding the shape and position of the air exhaust, are defined in claims 4, 5 and 6. In each of these embodiments, the air exhaust may be provided at a position radially spaced from the peripheral edge of the information disc, thus minimising the risk of any back-flow from the air exhaust to the information surface.

To minimise the air flow resistance which is present in the air flow passage from the air filtering means to the air exhaust and to contribute to the prevention of any undesirable air flow from the outside into the casing different from the desirable air flow from the inlet through the air filtering means and the casing to the exhaust, an advantageous embodiment of the invention may be used as defined in claim 7.

Other objects and advantages of the present invention will become apparent from the following description when taken in conjunction with the accompanying drawings which refer to non-limitative examples of embodiments of the invention for illustrative purposes only, in which:

In the following, the recording/reproducing device of the invention will be described with reference to the accompanying drawings.

Figure 1:
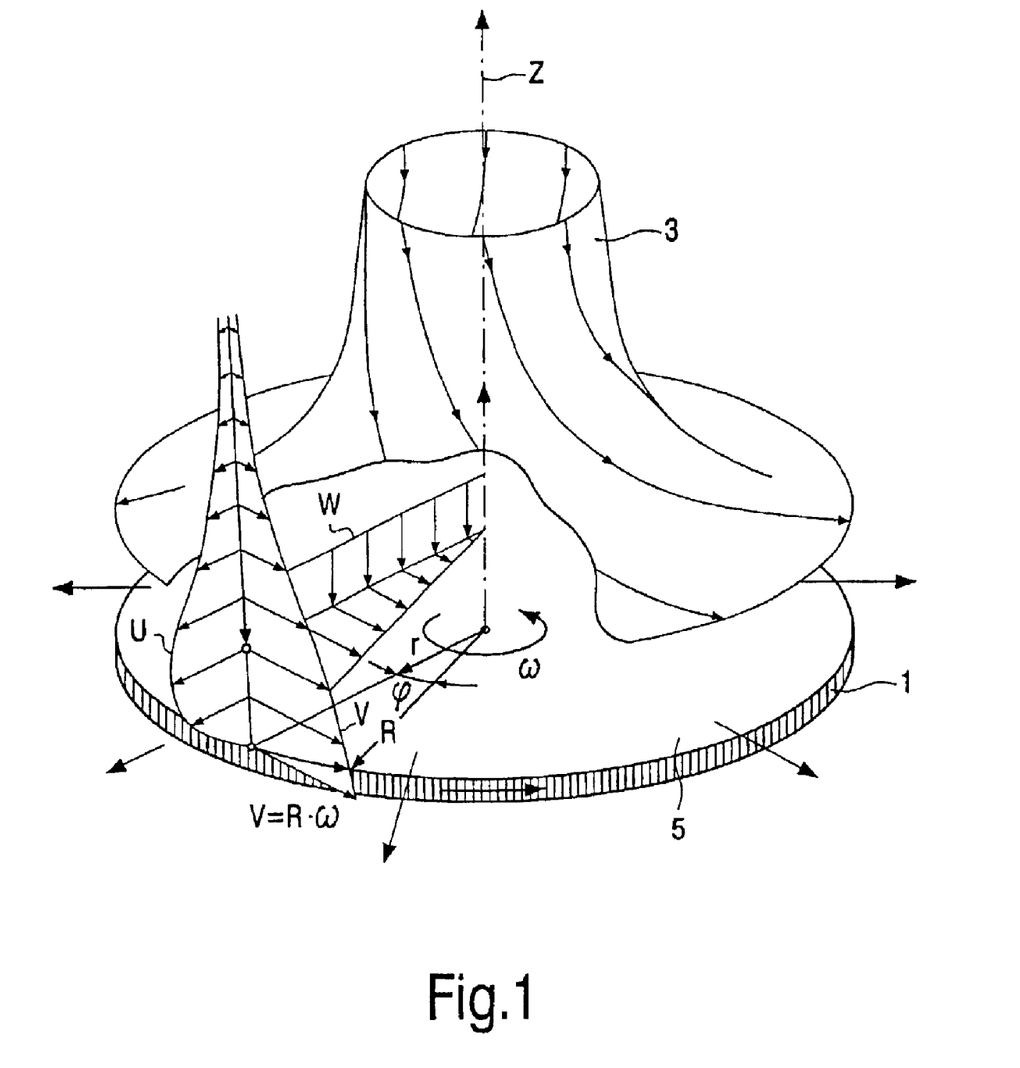
FIG. 1 is a schematic perspective top view of a rotating information disc rotating in air in free space showing a naturally occurring air flow to and over the disc as well as velocity profiles of the air over the disc.

FIG. 1 shows a disc 1, rotating in free space in a horizontal position. In the naturally occurring air flow 3, which is axial in relation to the axis of rotation Z of the disc 1 and is indicated by flow arrows, which is induced by the pumping action of the rotating disc 1, a distinction may be made between three velocity components in the air flow 3 in the vicinity of the disc surface 5:

(1) An air layer adjacent the top main surface 5 of the rotating disc 1 will be entrained by air friction forces. The tangential flow V which will result will have a maximum velocity $V=\omega \cdot r$, with $\omega$ being the angular frequency of the disc 1 and r being the local radius of the tangent.

(2) Centrifugal forces acting on the air layer rotating with the disc 1 will cause a secondary flow u above the rotating disc 1 which has a radial outward component. This radial flow increases with the rotation frequency of the disc. At a rotation frequency of 50 Hz, for example, there may be a radial air flow over the disc surface of approximately 38 l/min.

(3) The radial air flow u will be supplemented by an axial air flow w.

A number of dust particles will be taken along by the axial air flow 3 from the ambient air and will deposit on the rotating disc 1, for example, under the influence of gravity and static electricity of the disc and the particle. As the rotation frequency increases, more air will flow over the disc surface 5 and more dust particles will be deposited on the disc. At larger local diameters r, more air flows over the disc surface 5 and more dust particles will be locally deposited.

The same considerations hold true for the bottom side of the disc 1, although fewer particles will be deposited there because gravity tends to pull dust particles away from the disc surface.

Figure 2:
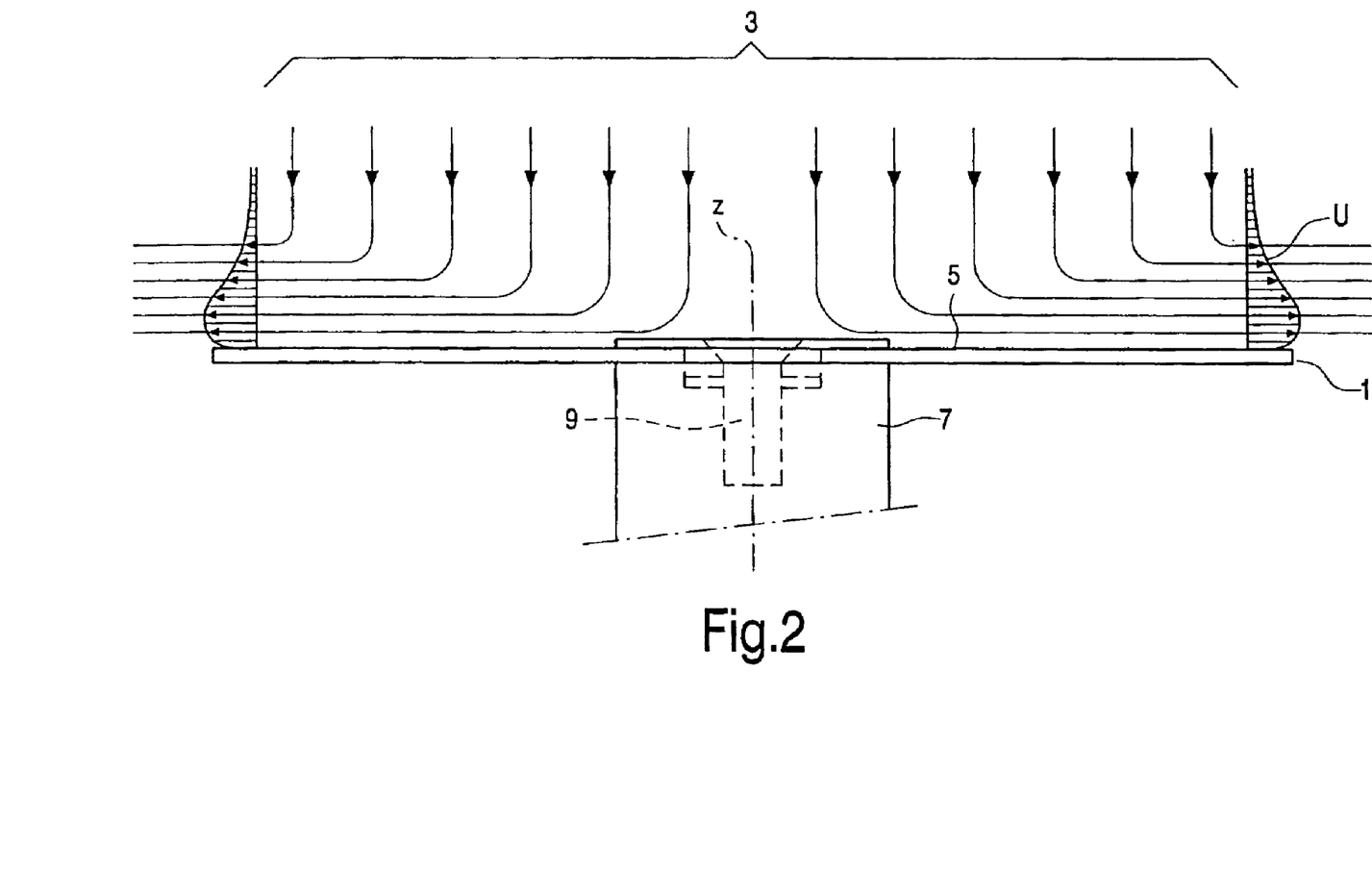
FIG. 2 is a schematic partial side view of an information disc on a disc support rotating in air in free space showing the velocity profile of the radial and axial air flow over the disc.

FIG. 2 shows the disc 1 arranged on top of a turntable 7 rotated by a drive spindle 9 of a disk driving arrangement, the remaining parts of which are not shown and may be of any conventional type.

Figure 3:
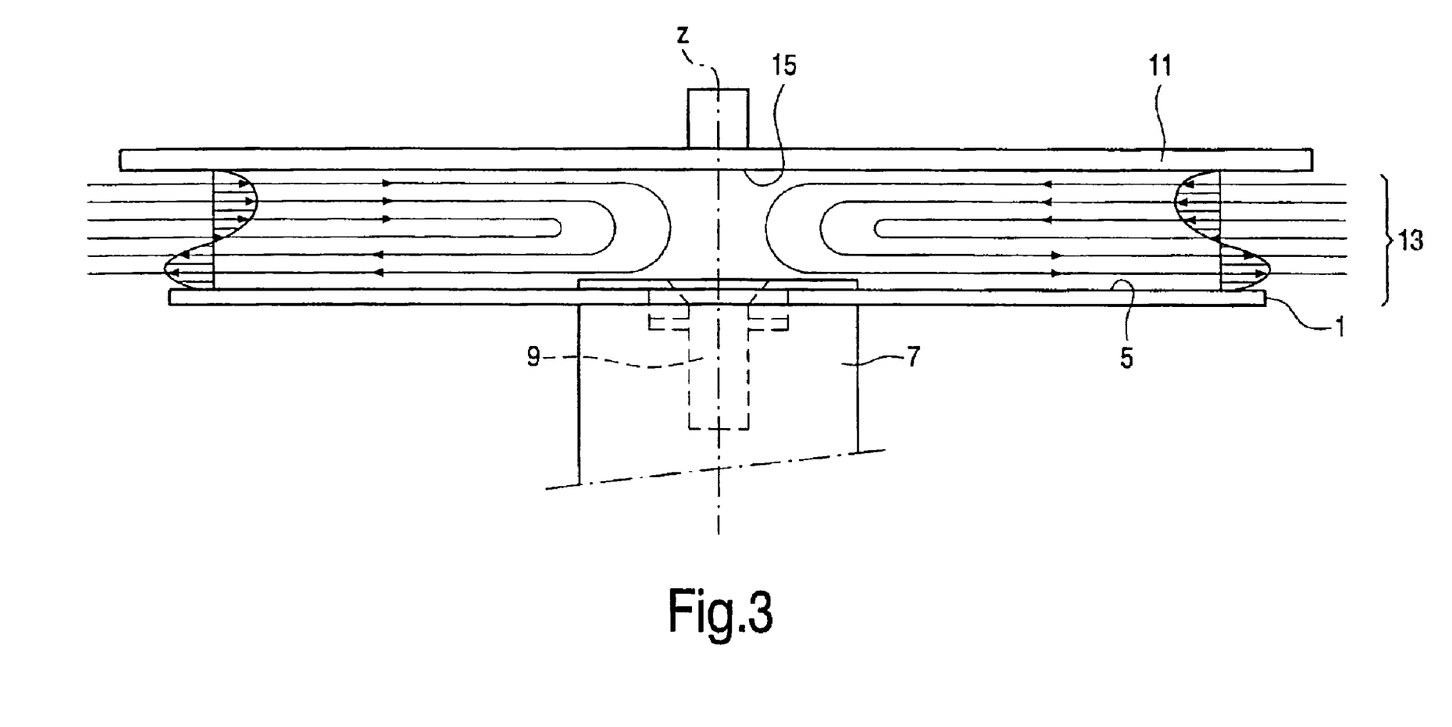
FIG. 3 is a schematic partial side view similar to FIG. 3 with a stationary disc placed at some distance over the rotating information disc.

When the rotating disc 1 is covered at the top side by a stationary disc (as in FIG. 3) having the same diameter or a larger diameter than the rotating disc 1, there will still be a continuous air flow 13 over the upper surface 5 of the rotating disc 1 and in a radial direction outwardly, induced by the naturally occurring pumping action of the rotating disc. In FIG. 3, the speed profile u1 of the air flow 13 between the stationary disc 11 and the rotating disc 1 is indicated.

This airflow 13 is supplied over the bottom surface 15 of the stationary disc 11 in a radial inward direction. Dust particles present in the ambient air are taken along by the inwardly flowing part of the air flow 13 between the stationary disc 11 and the rotating disc 1 and may deposit on the rotating disc 1.

Figure 4:
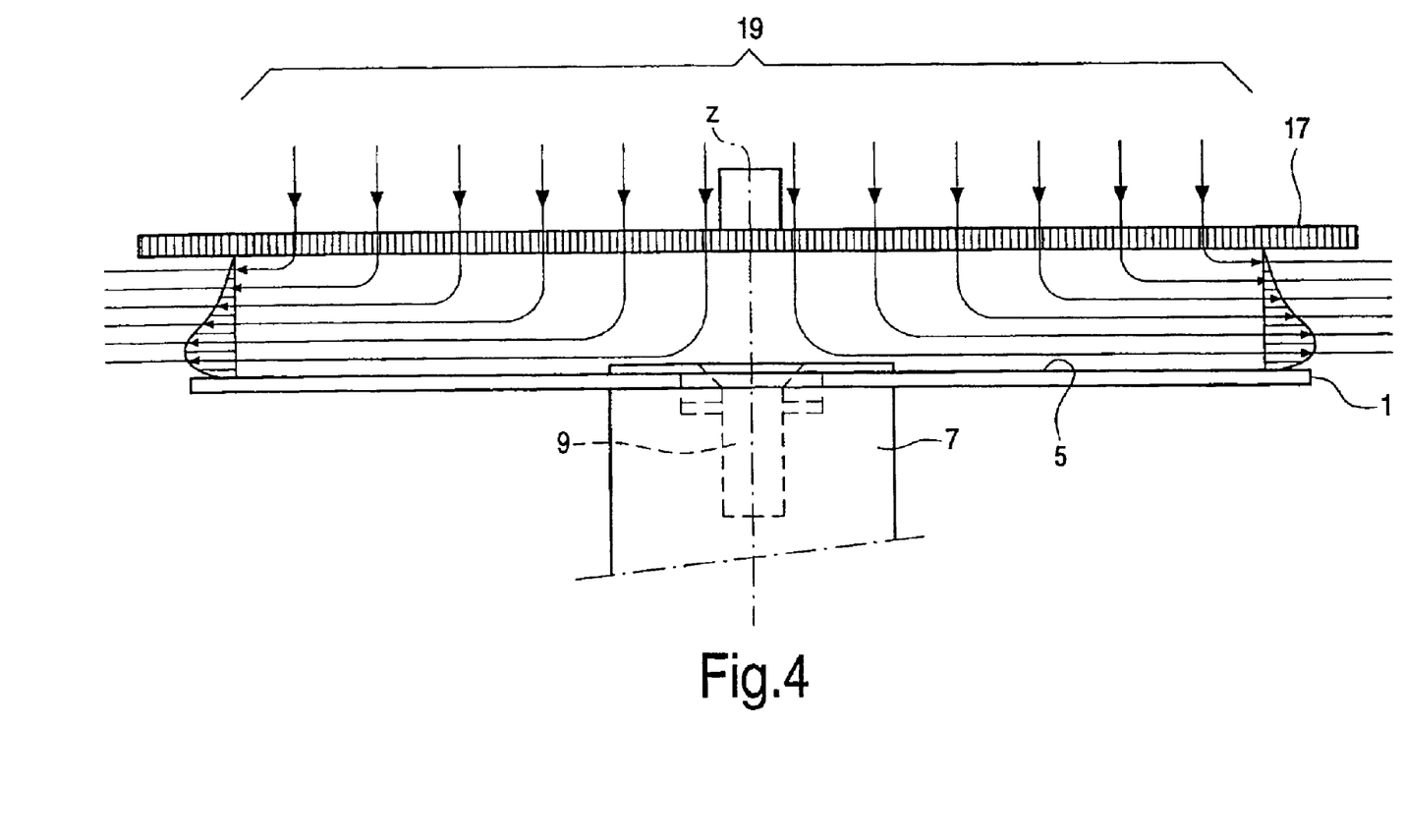
FIG. 4 is a view similar to FIG. 3 in which the stationary disc is shown in section and is air-pervious.

FIG. 4 shows an arrangement similar to the arrangement of FIG. 3 in which, however, the stationary disc 11 of FIG. 3 has been replaced by a stationary air-pervious disc 17 which acts as a filter disc. The filter disc 17 exhibits a low air flow resistance value so that an axially directed air flow 19 is induced by the naturally occurring pumping action of the rotating information disc 1 and through the filter disc 17. The low air flow resistance filter disc 17 will thus preclude a radially inwardly directed air flow, such as in FIG. 3, between the rotating disc 1 and the stationary filter disc 17. Substantially the whole of the radial air flow between the rotating disc 1 and the stationary filter disc 17 is therefore radially outwardly directed. If the filter disc 17 is configured such that it exhibits the property of filtering dust particles from the ambient air, then the air flow over the rotating information disc 1 in the radially outward direction will comprise fewer and possibly considerably fewer dust particles per unit of volume compared to the ambient air. Fewer dust particles will thus be deposited on the information surface 5 of the rotating information disc 1.

Figure 5:
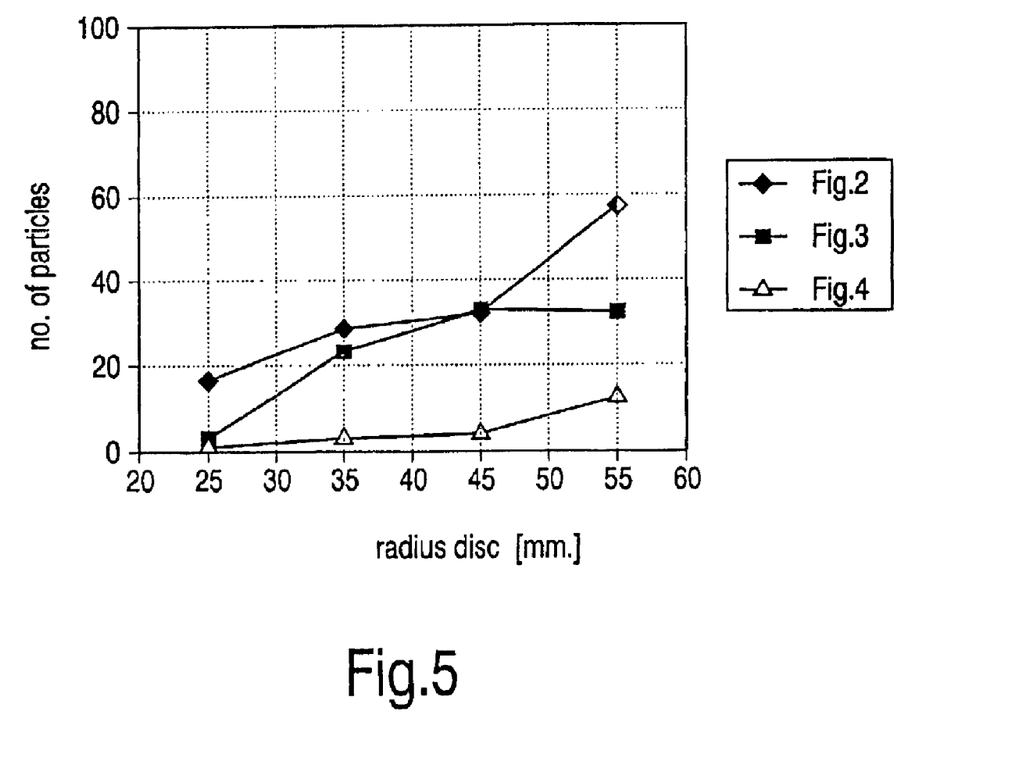
FIG. 5 is a graph showing measurement results of the number of particles per unit of area deposited on a rotating information disc over time under three different conditions.

Referring now to FIG. 5, the graph of this Figure shows measuring results regarding the contamination of the information surface of an information disc, which contamination is measured as the number of dust particles per unit of surface area. The three curves depicted in the graph relate to measurements on information discs in situations in accordance with FIGS. 2, 3 and 4, respectively, under the following conditions:

| | |
|---|---|
| Dimensions of the free space: | 1 × 1 × 1 m |
| Velocity of the axial air flow in free space: | 0,02 m/min |
| Type of dust: | ISO 12103-A1 Arizona Ultrafine testdust (Powder Technology Inc. Burnsville, Minnesota) |
| Amount of dust particles added: | 1 g/hr |
| Rotation frequency of the disc: | 2,000 rotations/min. |
| Spacing between rotating and stationary disc: | 1,2 mm |
| Filter type: | HEPA filter according to IES-RP-CC001.3. (CAMFIL) |
| Period of contamination: | 5 min. |

It will be readily apparent from the graph of FIG. 5 that providing a stationary disc as in FIG. 3 will diminish the contamination problems only below and above the approximate local radius of 45 mm, while approximately at the local radius of 45 mm the contamination problems are actually even increased. The provision of a filter disc as in FIG. 4, however, will substantially decrease the number of dust particles deposited per unit of area of the information surface by a factor approaching a factor of 4.

The measurement results shown in FIG. 5 regarding the arrangement shown in FIG. 4 clearly indicate the results obtainable by the invention. The fact that still some dust has been collected on the information surface between the radii of 45 and 55 mm. indicates that some ambient air may have flown back.

This may be prevented by optimisation of the shape of the exhaust opening in such a way that, at each point of the exhaust opening, the prevailing air flow is outwardly directed. Possible examples will be discussed in FIGS. 6 to 8.

Figure 6:
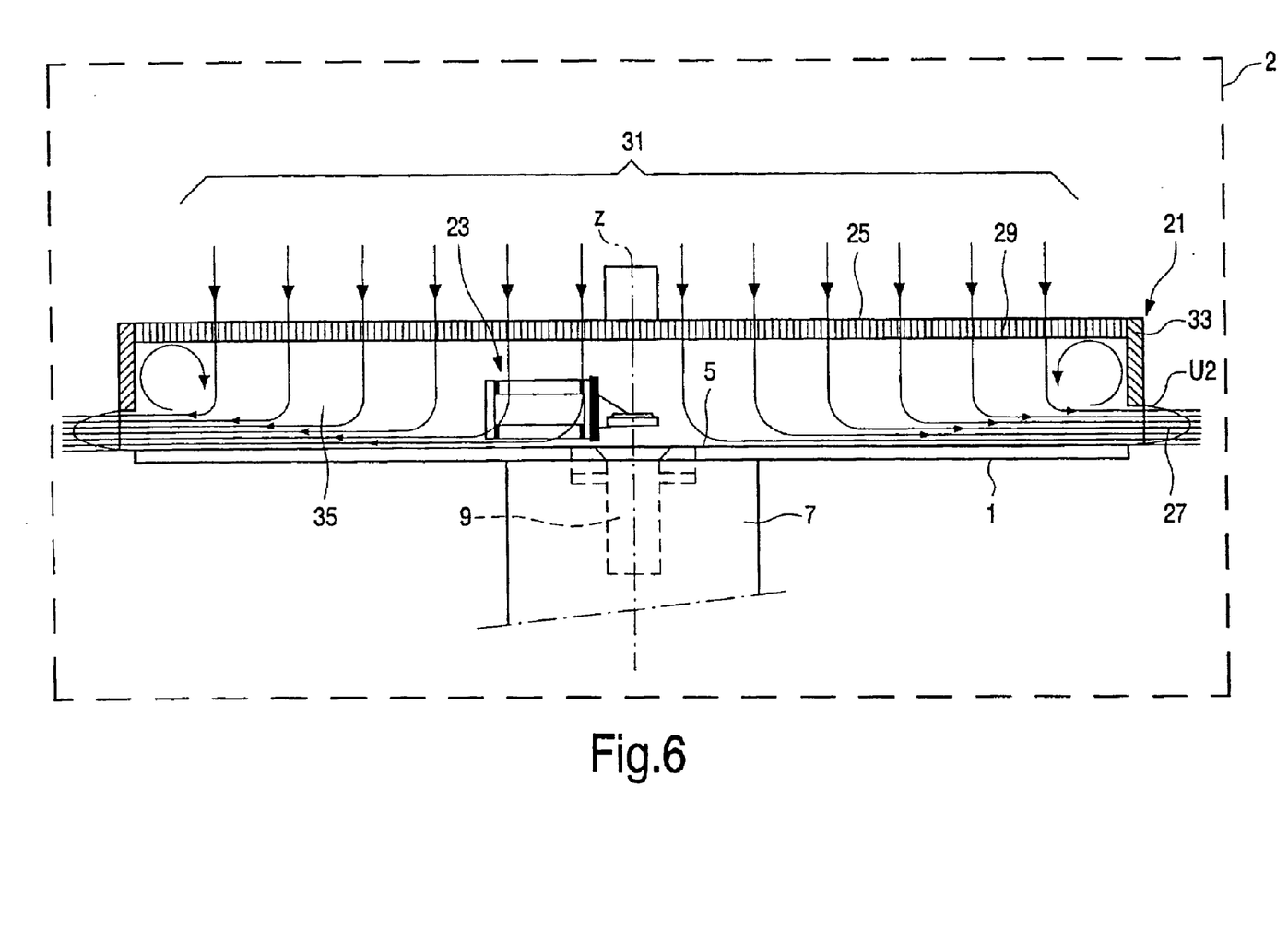
FIG. 6 is a schematic view similar to FIG. 4 showing an embodiment of the invention having an exhaust opening comprising a peripheral gap in the peripheral wall of a casing.
Figure 7:
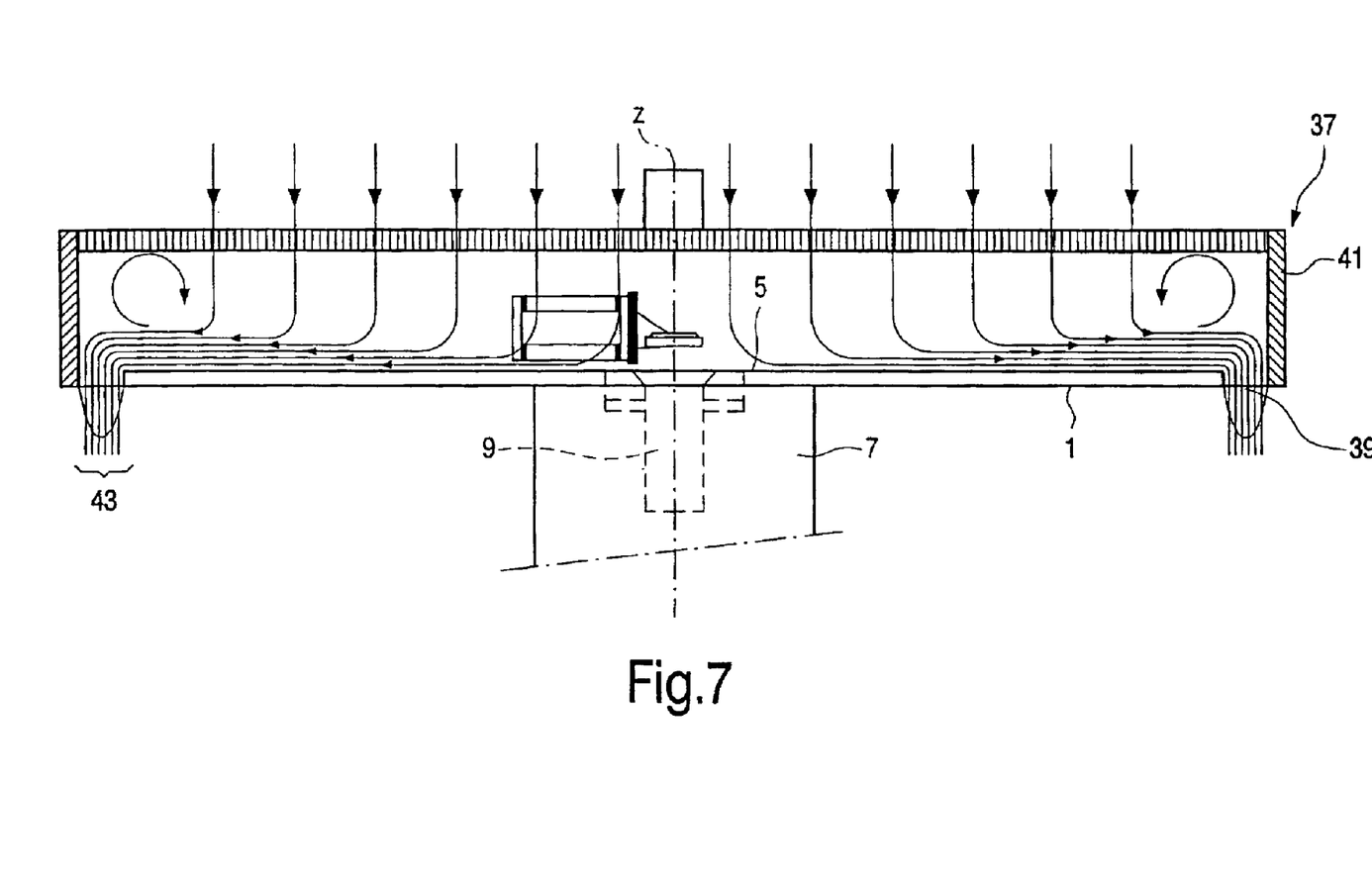
FIG. 7 is a view similar to FIG. 6 showing a further embodiment of the invention having an air exhaust opening comprising a co-axial annular exhaust opening disposed diametrically outside the information disc.

Referring now to FIGS. 6, and 7, two embodiments of possible applications of the invention are shown. In FIG. 6, a casing 21 is provided within a housing 2 (shown only symbolically only in FIG. 6 in phantom lines) of a recording/reproducing device for recording/reproducing information on/from the information disc 1 which is rotatable about an axis of rotation Z. A recording/reproducing pickup device 23, which is only shown schematically and is not particularly relevant for the present invention and may be of any conventional kind, is indicated by reference numeral 23. The casing 21 is provided within the housing (not shown) of the recording/reproducing device and encases an information surface 5 of the information disc 1 which is disposed on the disc driving arrangement comprising a turn table 7 and a drive spindle 9. The casing 21 is provided with an air inlet 25 for air to be filtered as well as an air exhaust 27 for filtered air. Air filtering means 29 are provided similar to the filter disc 17 of FIG. 4 and are disposed adjacent to the information surface 5 in a parallel spaced relation thereto.

The air filtering means 29 are arranged stationary within the housing (not shown) and thus do not rotate with the information disc 1. The air filtering means 29 extends over the disc information surface 5 and the air flow 31 flows axially relative to the axis of rotation Z of the information disc 1 through the filtering means 29.

The air flow 31 is induced by the naturally occurring pumping action of the rotating information disc 1 and the air flow resistance of the air inlet 25, while the air filtering means 29 and the air exhaust 27 exhibit mutually adapted air flow resistance values which substantially prevent, during operation of the device, any air flow from outside the casing 21, through the casing and out of the exhaust 27 different from the air flow 31 from the air inlet 25 through the air filtering means 29, the casing 21 and out of the exhaust 27. This essentially means that the air flow resistance which is experienced by the air flowing into the casing is lower than the air flow resistance which is experienced by the air flowing out of the casing.

The casing 21 comprises two parallel spaced disc-shaped main walls 29 and 1 which are arranged perpendicularly in relation to the axis of rotation Z, as well as a cylindrical co-axial peripheral wall 33. With this embodiment, of the invention, the stationary main wall and the air filtering means 29 substantially coincide and comprise the entire stationary upper portion of the casing 21. With this embodiment, the air inlet 25 of the casing is constituted by the upper surface of the air filtering means 29.

Still referring to FIG. 6, the recording/reproducing device is adapted for use with an information disc 1 having an information surface 5 on one side only. In this case, one of the main walls of the casing 21 may therefore consist of the rotatable information disc 1 itself. The exhaust 27 comprises a co-axial exhaust gap in the casing wall 33, which gap is disposed diametrically outside the information disc 1. The exhaust 27 comprises an exhaust gap in the peripheral wall 33 of the casing itself. Alternatively, the peripheral wall could be made entirely or in part of a filter material.

A desirable profile U2 is shown of the air flow which is flowing from the exhaust gap 27 in a radially outward direction. The velocity profile U2 would prevent any air flow from the ambient air through the exhaust gap 27 into the inner space 35 of the casing 21.

In many respects, the arrangement of FIG. 7 is similar to the arrangement of FIG. 6 and will therefore be described in less detail. The main difference between the embodiments of FIGS. 6 and 7 is that the casing 37 of FIG. 7 has a somewhat larger diameter allowing an exhaust gap 39 to consist of an annular gap between the main wall 1 which consists of the rotatable information disc 1 and a peripheral wall 41 of the casing 37. Due to this configuration, the air flow 43 from the exhaust gap may flow in a more axial direction.

Figure 8:
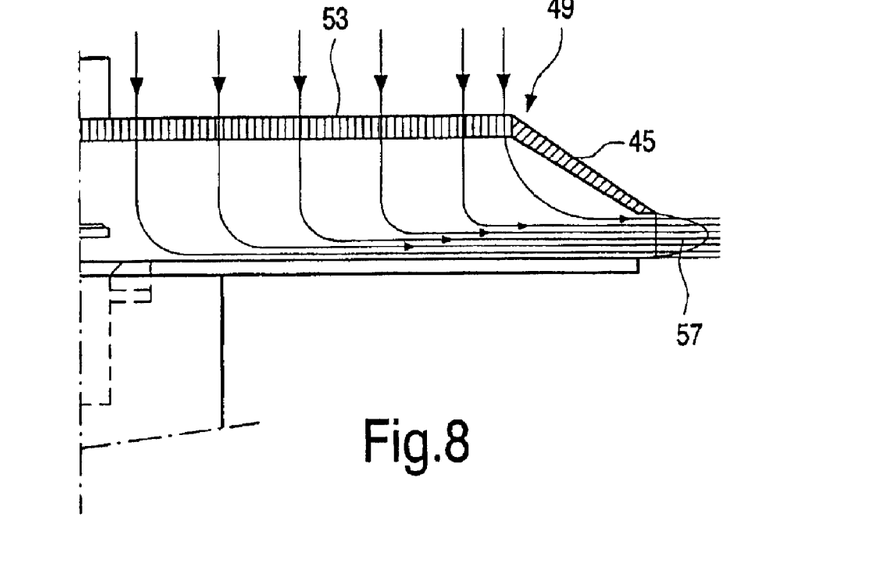
FIGS. 8 and 9 show embodiments of the invention similar to the embodiments of FIGS. 7 and 6, respectively, but having a peripheral casing wall exhibiting an aerodynamically profiled shape to prevent vortices over the disc.
Figure 9:
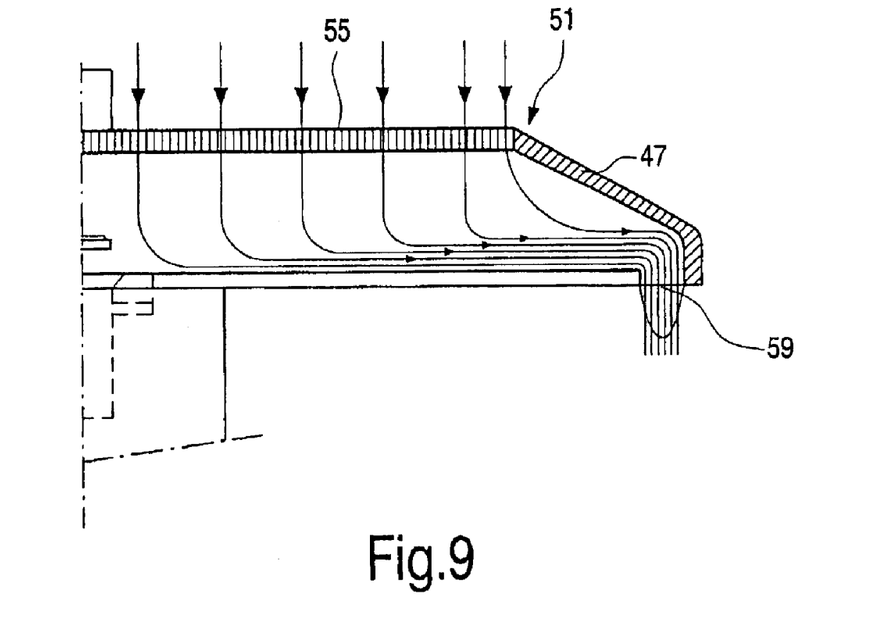

Referring now to FIGS. 8 and 9, two modified embodiments of FIGS. 6 and 7, respectively, are shown, which are provided with peripheral walls 45 and 47 of casings 49 and 51 exhibiting an aerodynamically profiled shape between the air inlets 53 and 55 and the exhausts 57 and 59 which differ from the straight cylindrical shape which is shown in FIGS. 6 and 7, respectively.

It will be appreciated that the foregoing examples, given for purposes of illustration, are not to be considered as limiting the scope of this invention which is defined by the following claims and all equivalents thereto. The air filtering means may be provided on only a part of the upper surface of a main wall of a casing or separate from a main wall. The casing may be provided with two main walls, one on each side of the information disc. Air filtering means may also be present over opposite disc information surfaces provided on opposite sides of the information disc.

What is claimed is:

1. A recording/reproducing device for recording/reproducing information on/from an information disc which is rotatable about an axis of rotation by means of a pick-up device movable over the rotating information disc, the device comprising:

a housing which, at least during operation of the device, is at least largely closed, a disc driving arrangement within the housing, comprising a drive spindle which is rotatable about said axis, air filtering means adapted to filter an air flow of ambient air present within the housing during operation of the device flowing over an information surface of a rotating information disc and disposed adjacent to the information surface in parallel spaced relation thereto, a casing within the housing encasing an information surface of an information disc disposed on the disc driving arrangement and provided with an air inlet for air to be filtered and an air exhaust for filtered air, characterized in that the air filtering means are arranged stationary within the housing, the air filtering means extend over the entirety of the disc information surface, the airflow flows axially through the filtering means, the airflow is induced by the naturally occurring pumping action of the rotating information disc, and the air flow resistance of the air inlet, the air filtering means and the air exhaust exhibit mutually adapted air flow resistance values substantially preventing, during operation of the device, any air flow from outside the casing, through the casing and out of the exhaust different from the air flow from the air inlet, through the air filtering means, the casing and out of the exhaust.

2. A recording/reproducing device as claimed in claim 1, characterized in that:
the casing comprises two parallel spaced disc-shaped main walls arranged perpendicularly in relation to the axis of rotation as well as a cylindrical co-axial peripheral wall, and
the air filtering means comprise at least a portion of a main wall.

3. A recording/reproducing device as claimed in claim 1, characterized in that:
the device is adapted for use with an information disc having an information surface on one side only, and
one of the main walls of the casing further comprises the information disc itself, if present.

4. A recording/reproducing device as claimed in claim 1, characterized in that:
the exhaust comprises a co-axial exhaust gap in a casing wall, the exhaust gap being disposed diametrically outside the information disc.

5. A recording/reproducing device as claimed in claim 4, characterized in that:
the exhaust gap comprises a peripheral gap in the peripheral wall of the casing.

6. A recording/reproducing device as claimed in claim 4, characterized in that:
the exhaust gap comprises an annular gap between a main wall and the peripheral wall of the casing.

7. Recording/reproducing device as claimed in claim 2, characterized in that:
the peripheral wall of the casing exhibits an aero-dynamically profiled shape between the air inlet and the air exhaust which differs from a straight cylindrical shape.

8. An air filtering apparatus for a recording/reproducing device:
an enclosable housing;
a disc driving arrangement the housing having a rotatable spindle for rotating an information disc about an axis,
the air filtering apparatus adapted to filter an air flow of ambient air present within the housing during operation of the device flowing over an information surface on the information disc within the housing; and
a casing within the housing encasing the information surface and provided with an air inlet for air to be filtered as well as an air exhaust for filtered air,
wherein the air filtering apparatus is arranged to be stationary within the housing, and has an air filter that extends over the entirety of the disc information surface, and airflow flows axially through the filtering apparatus, airflow is induced by the naturally occurring pumping action that occurs by rotating the information disc, and air flow resistance of the air inlet, the air filtering apparatus and the air exhaust exhibit mutually adapted air flow resistance values substantially preventing, during rotation of the information disc, any air flow from outside the casing except through the filter.

9. An air filtering apparatus as in claim 8, further comprising:
the casing comprises two parallel spaced disc
shaped main walls arranged perpendicularly in relation to the axis of rotation and a cylindrical co-axial peripheral wall; and
the air filtering apparatus comprises at least a portion of a main wall.

10. An air filtering apparatus as in claim 8, wherein the device is adapted for use with the information disc having the information surface on one side only.

11. An air filtering apparatus as in claim 10, wherein one of the main walls of the casing further comprises the information disc itself.

12. An air filtering apparatus as in claim 8, wherein the exhaust comprises a co-axial exhaust gap in a wall to the casing.

13. An air filtering apparatus as in claim 8, wherein the exhaust gap further comprises a peripheral gap in a peripheral wall of the casing.

14. An air filtering apparatus as in claim 10, wherein the exhaust gap further comprises an annular gap between a main wall and a peripheral wall of the casing.

15. An air filtering apparatus as in claim 10, wherein a peripheral wall of the casing has a conical shape concentric about the axis.

16. An air filtering apparatus as in claim 15 wherein the conical shape provides an aero-dynamically profiled shape between the air inlet and the air exhaust that allow air to flow more easily.

* * * * *